C. B. LAWTON.
MANUFACTURE OF GLASS ARTICLES.
APPLICATION FILED JAN. 9, 1909.

942,651.

Patented Dec. 7, 1909.
3 SHEETS—SHEET 1.

WITNESSES:
J. Herbert Bradley.
Edward F. Moser

INVENTOR
Charles B. Lawton.
by Christy and Christy
Att'ys

C. B. LAWTON.
MANUFACTURE OF GLASS ARTICLES.
APPLICATION FILED JAN. 9, 1909.

942,651.

Patented Dec. 7, 1909.
3 SHEETS—SHEET 2.

WITNESSES:
O. Herbert Bradley
Edward F. Moser

INVENTOR
Charles B. Lawton
by Christy and Christy
Atty's

C. B. LAWTON.
MANUFACTURE OF GLASS ARTICLES.
APPLICATION FILED JAN. 9, 1909.

942,651.

Patented Dec. 7, 1909.
3 SHEETS—SHEET 3.

WITNESSES:
J. Herbert Bradley
Edward T. Moser

INVENTOR
Charles B. Lawton
by Christy and Christy
Atty's

UNITED STATES PATENT OFFICE.

CHARLES B. LAWTON, OF PENN TOWNSHIP, ALLEGHENY COUNTY, PENNSYLVANIA.

MANUFACTURE OF GLASS ARTICLES.

942,651. Specification of Letters Patent. Patented Dec. 7, 1909.

Application filed January 9, 1909. Serial No. 471,455.

*To all whom it may concern:*

Be it known that I, CHARLES B. LAWTON, residing at Penn township, in the county of Allegheny and State of Pennsylvania, a citizen of the United States, have invented or discovered certain new and useful Improvements in Manufacture of Glass Articles, of which improvements the following is a specification.

The invention described herein relates to certain improvements in the manufacture of glass bricks, and has for its object a construction of shaping apparatus whereby the portions of the glass which will form the outer faces of the brick will come into contact with the forming walls at the same time thereby avoiding the formation of "chill" spots.

It is a further object of the invention to prevent the formation of pressure cracks or marks.

The invention also has for its object the provision of a support for the brick during cooling and the removal of the thin fin or blow over formed in the pressing operation.

The invention is hereinafter more fully described and claimed.

Figure 1:
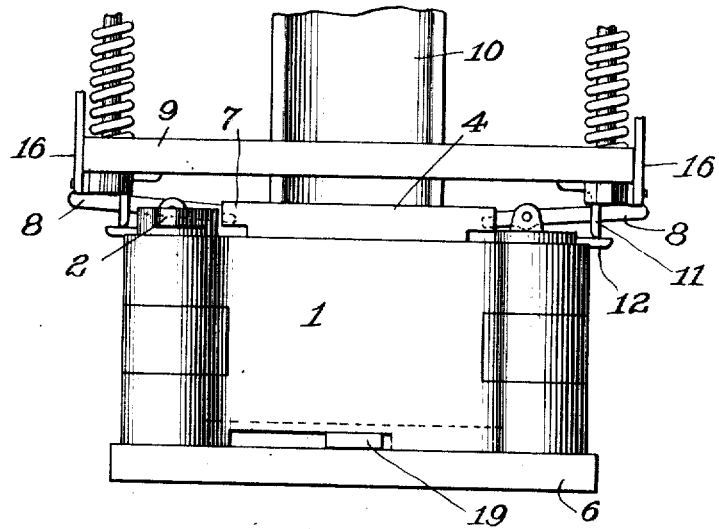
Figure 2:
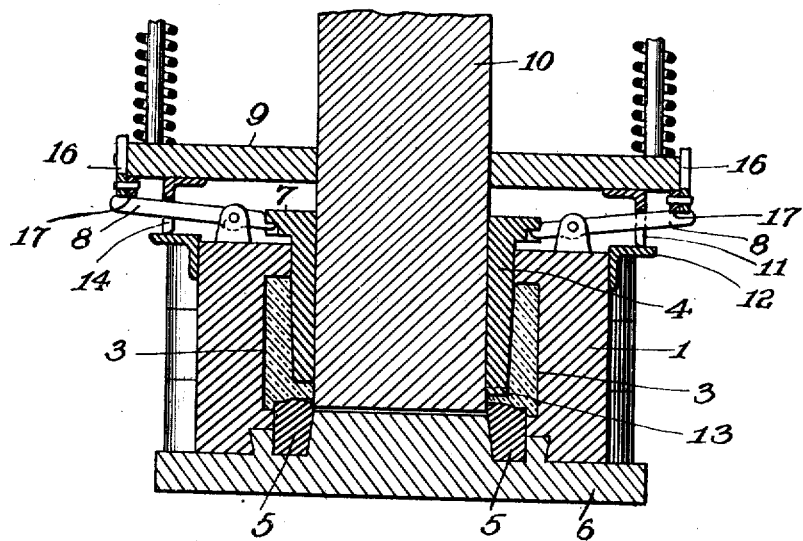
Figure 3:
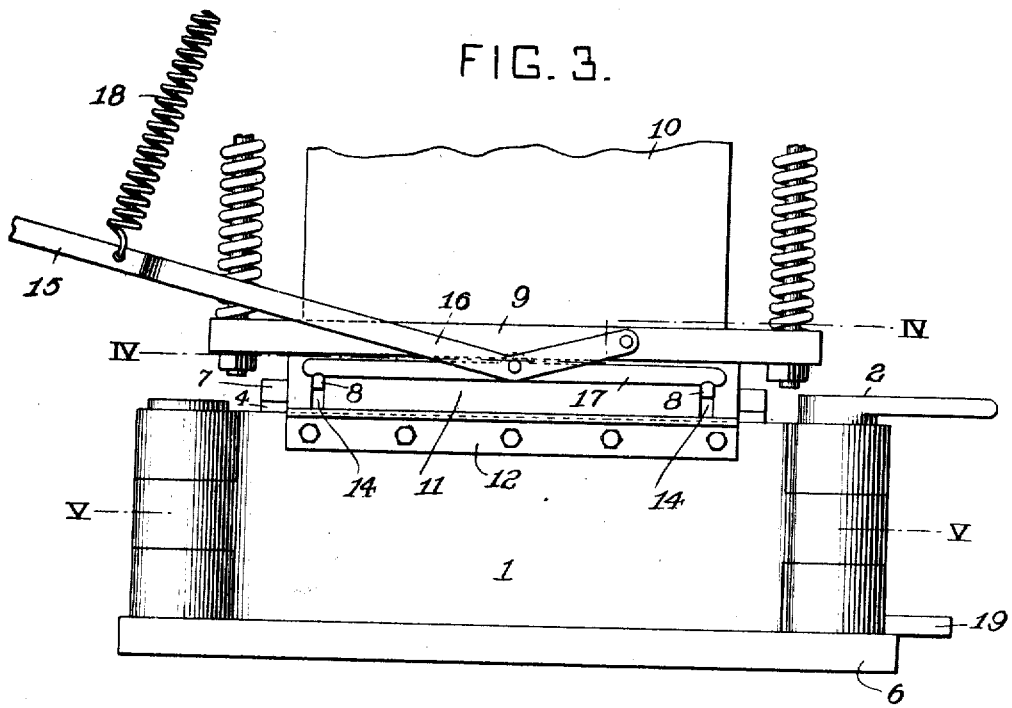
Figure 4:
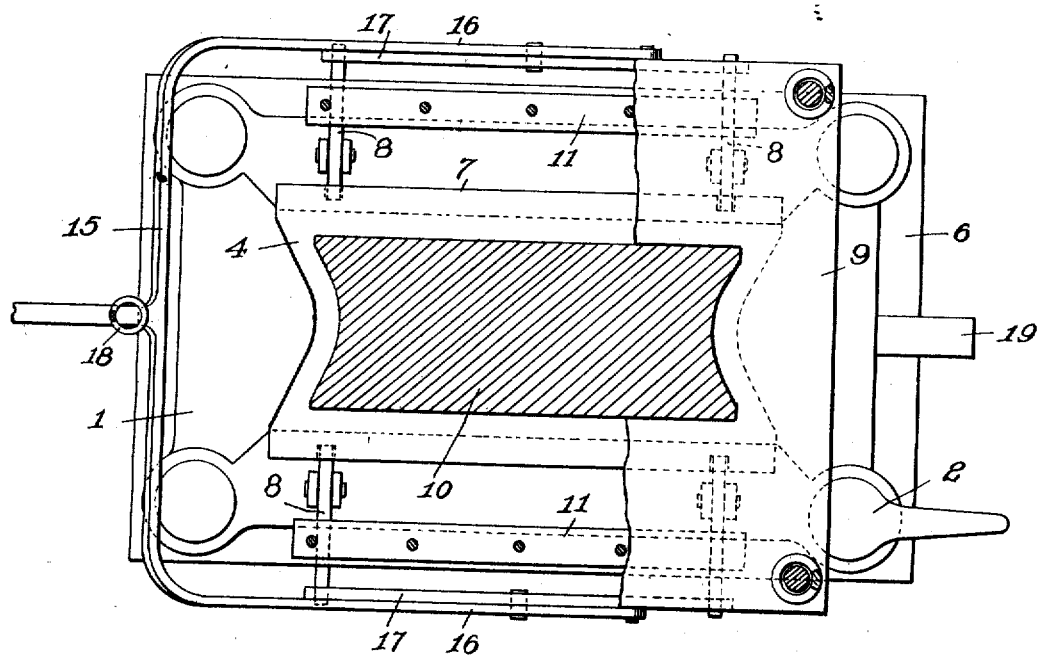
Figure 5:
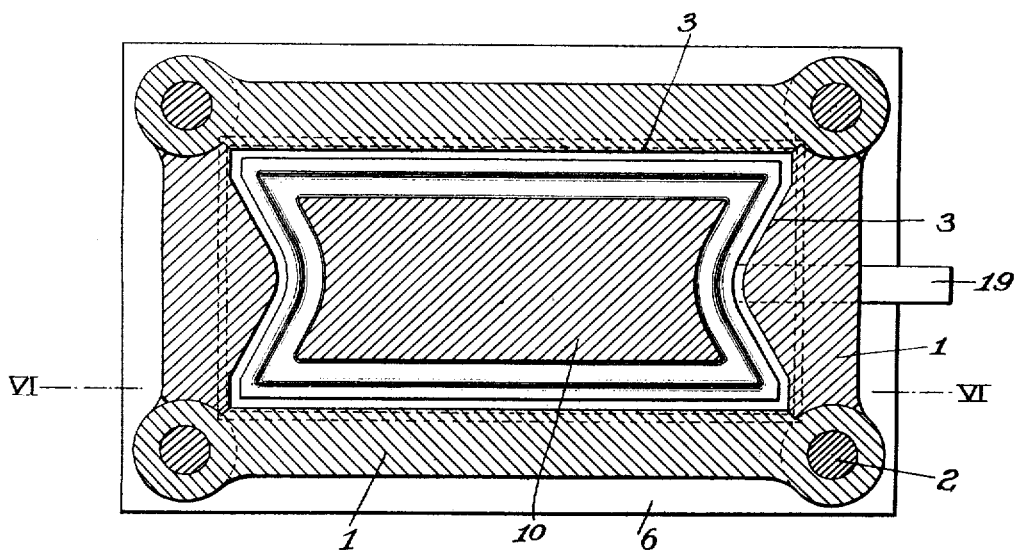
Figure 6:
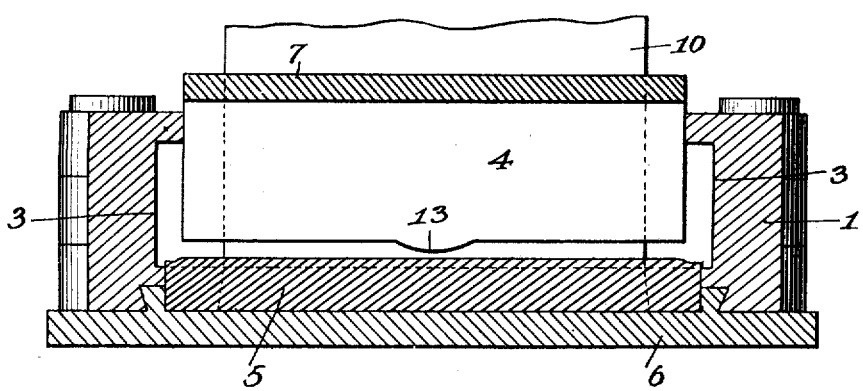
Figure 7:
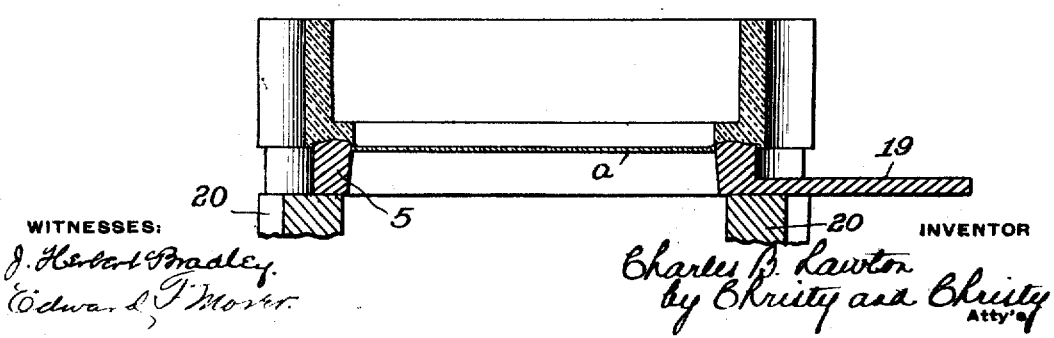

In the accompanying drawings forming a part of this specification Figure 1 is a side elevation of a mold embodying my improvement and a plunger and presser plate; Fig. 2 is a sectional elevation of the apparatus shown in Fig. 1; Fig. 3 is a side elevation at right angles to the elevation shown in Fig. 1; Fig. 4 is a sectional plan view on a plane indicated by the line IV—IV Fig. 3; Fig. 5 is a sectional plan view on a plane indicated by the line V—V Fig. 3; Fig. 6 is a sectional elevation on a plane indicated by the line VI—VI, Fig. 5, and Fig. 7 is a sectional elevation showing the manner of supporting the brick during cooling and the removal of the fin.

In the practice of my invention, the mold 1 is made in sections hinged together at the corners, one of the pintles as 2 being removable to permit of the opening of the mold in a manner well known in the art. The sides and upper wall of the matrix 3 are formed by recessing the inner walls of the mold, a third side being formed by skirt or annular curtain 4, and the fourth side or bottom being formed in part at least by the supporting ring or stool 5. When it is desired to form bricks with recessed ends, the end walls of the mold are formed with inwardly projecting portions as shown in Figs. 4 and 5. The ring or stool 5 is arranged in a groove in the boss or projection on the bottom plate 6, and the mold sections are closed around such boss as shown in Figs. 2 and 6. The annular curtain or skirt 4 is made of such a length that, at the beginning of the operation, its lower edge will rest on the ring or stool 5, or at such a short distance therefrom that glass will not flow to any material extent into the matrix. The upper end of the skirt or curtain which extends above the mold is provided with a flange 7 or other lateral extension with which dogs 8 pivotally mounted on the mold will engage. These dogs 8 are so arranged that they will be shifted to slightly raise the skirt by the presser plate 9 at about the time the glass is caused to flow under the pressure of the plunger 10, which, as shown in Fig. 2 moves down through the curtain or skirt. It is preferred that the dogs should be shifted by the presser plate through the medium of a flange 11 so secured to the presser plate as to contact with a stop 12 on the mold, and thereby arrest the downward movement of the presser plate, while the plunger continues its movement through said plate.

In making bricks, the glass is placed within the skirt or curtain which at that time rests on or is closely adjacent to the ring or stool and consequently sufficient glass will not flow into the matrix to contact with the outer wall thereof. The plunger then moves down into the skirt or curtain, and as it begins to bear on the glass, the presser plate will shift the dogs 8 thereby raising the skirt or curtain to afford a sufficient opening for the flow of the glass under the pressure of the plunger, into the matrix. As chill marks are due to some portions of glass coming into contact with and being chilled by the mold in advance of the remaining portions, and in advance of the shaping movement or flow of the glass, it is evident that by preventing any portions of the glass reaching the outer wall of the matrix materially in advance of other portions, the formation of the chill marks will be prevented. Another difficulty encountered in the manufacture of bricks is the formation of pressure cracks due to excessive pressure, which may be the result of lack of skill of the pressman or the placing of too much glass in the mold. Both of these difficulties can be obviated by placing in the mold a smaller quantity of glass than is required to entirely fill the matrix. As the back and end walls of the brick are not exposed when built into a wall, provision is made for localizing the deficit of glass in the back or one or both ends. This localization is effected by forming a swell 13 on the lower edge of the curtain as shown in Figs. 2 and 6. This swell is so proportioned that when the skirt or curtain is down the gap between the curtain and ring will be too small for a flow of glass into the matrix, and when the curtain is raised, the gap or opening, except where contracted by the swell 13 on the curtain, will permit a free flow of glass under pressure. By reason of the retardation produced by the swell 13, the portions of the matrix out of line with the swell or enlargement will be filled before there is any material flow into the portion of the matrix in line with the swell. Hence if there is not sufficient glass to fill the matrix, the uncompleted portion of the brick will be adjacent to the swell or enlargement 13. By properly proportioning the gap or opening, both where a free flow is desired and at the contracted portion, there will not be sufficient pressure on the glass to cause a flow through the contracted portion until other portions of the mold have been completely filled, and as the quantity placed in the mold is smaller than that necessary to completely fill the matrix, the glass cannot at any time be subjected to a pressure greater than necessary to fill the desired portions.

It has been found that the contraction of the glass around the skirt or curtain due to solidification is liable to produce cracks similar to pressure cracks. In order to avoid the formation of such contraction cracks, provision should be made to permit a free contraction of the glass, but without leaving the glass unsupported during solidification. A desirable manner of accomplishing this function consists in slightly tapering the skirt or curtain exteriorly from the plane coincident with the upper wall of the matrix, and slightly raising the skirt after the completion of the article and before complete solidification and contraction can occur. The upward movement of the skirt can be effected in many ways. In the construction shown the ends of the dogs 8 extend into notches 14 in the flange 11, said notches being of sufficient depth to permit of a movement of the dogs, while the flange is in contact with the stop 12. A forked lever 15 has its arms 16 pivotally mounted on the pressed plate, and equalizing bars 17 are pivotally mounted on the arms 16 in such manner as to engage the ends of the dogs 8. The lever is held up by a spring 18. After the glass has been forced into the matrix and before solidification has occurred, the lever 15 is operated to slightly raise the skirt so that contraction can occur without injury to the glass. After solidification the skirt is removed and the mold opened, thus leaving the brick supported by the ring or stool. The latter is then lifted from the bottom plate of the mold, it being provided with handles 19, and placed on a supporting frame 20. The film $a$ is then broken out. It will be observed that the stool supports the brick to the lines along which the film is connected to the brick so that there will not be any liability of injury to the brick and the film can be cleanly removed.

It will be observed that the annular curtain or wall when lowered forms a basin or receptacle for the glass from which the glass is forced by the plunger, the curtain being raised to permit the flow of glass at or about the time the plunger begins to exert pressure on the glass.

I claim herein as my invention:

1. In an apparatus for shaping glass, the combination of a mold, a skirt or movable wall forming a portion of the matrix of the mold, a plunger for forcing the glass into the matrix and means operative by the plunger operating means for shifting the skirt.

2. In an apparatus for shaping glass, the combination of a mold having a matrix, a basin or receptacle for glass, a movable wall controlling the flow of glass from the basin into the matrix, a plunger for forcing the glass into the matrix and means operative by the plunger for shifting said wall.

3. In an apparatus for shaping glass, the combination of a mold having an annular matrix, an annular skirt or shell forming the inner wall of the matrix and controlling the flow of glass into the matrix, a plunger for forcing the glass into the matrix, and means operative by the plunger for shifting the skirt.

4. In an apparatus for shaping glass, the combination of a mold and an annular removable stool forming a portion of the matrix and adapted to support the article when removed from the shaping apparatus.

5. In an apparatus for shaping glass, the combination of a mold having an annular matrix, and a ring or stool removably arranged in the bottom of the mold and forming a portion of the matrix and adapted to support the article adjacent to the fin or blow-over when removed from the mold, and while removing the fin or blow-over.

6. In an apparatus for shaping glass, the combination of a mold having an annular matrix, a skirt or shell forming the inner wall of the matrix and controlling the flow of glass into the matrix and provided with a swell adapted to retard the flow of glass, a plunger for forcing the glass into the matrix and means operative by the plunger for shifting the skirt.

7. In an apparatus for shaping glass, the combination of a mold having an annular matrix, a movable wall forming a portion of the matrix, a plunger for forcing glass into the matrix and means for shifting said wall to permit contraction of the completed article.

8. In an apparatus for shaping glass, the combination of a mold having an annular matrix, a skirt or shell forming the inner wall of the matrix and controlling the flow of glass into the matrix, a plunger for forcing glass into the matrix, means for shifting said skirt to permit the inflow of glass, and means for imparting a further movement to the skirt to permit of contraction of the completed article.

9. As an improvement in the art of forming annular articles, the method herein described which consists in forcing the glass into an annular matrix and then shifting the inner wall of the matrix to permit of contraction while maintaining an internal support for the glass.

10. As an improvement in the art of making glass articles, the method herein described which consists in forcing into the matrix a quantity of glass less than that required to fill the same, and retarding the flow of glass to a portion of the matrix.

In testimony whereof, I have hereunto set my hand.

CHARLES B. LAWTON.

Witnesses:
ALICE A. TRILL,
CHARLES BARNETT.